United States Patent
Finkenzeller

(10) Patent No.: US 11,415,181 B2
(45) Date of Patent: Aug. 16, 2022

(54) CLUTCH PACK HAVING AXIAL SOFTNESS INTRODUCED IN A SPECIFIC MANNER

(71) Applicant: Schaeffler Technologies AG & Co. KG, Herzogenaurach (DE)

(72) Inventor: Marc Finkenzeller, Gengenbach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/261,050

(22) PCT Filed: Jun. 12, 2019

(86) PCT No.: PCT/DE2019/100536
§ 371 (c)(1),
(2) Date: Jan. 18, 2021

(87) PCT Pub. No.: WO2020/030210
PCT Pub. Date: Feb. 13, 2020

(65) Prior Publication Data
US 2021/0293287 A1    Sep. 23, 2021

(30) Foreign Application Priority Data
Aug. 6, 2018  (DE) .................... 102018119002.6

(51) Int. Cl.
| | |
|---|---|
| F16D 13/69 | (2006.01) |
| F16D 13/52 | (2006.01) |
| F16D 13/58 | (2006.01) |
| F16D 13/68 | (2006.01) |
| F16D 13/64 | (2006.01) |

(52) U.S. Cl.
CPC ............. *F16D 13/69* (2013.01); *F16D 13/52* (2013.01); *F16D 13/585* (2013.01); *F16D 13/683* (2013.01); *F16D 2013/642* (2013.01)

(58) Field of Classification Search
CPC ....... F16D 13/642; F16D 13/683; F16D 13/69
See application file for complete search history.

(56) References Cited

U.S. PATENT DOCUMENTS 2,037,928 A * 4/1936 Saks ....................... F16D 13/64
                                                                  192/107 C
2,189,534 A * 2/1940 Ingersoll ................. F16D 13/64
                                                                  192/207

(Continued)

FOREIGN PATENT DOCUMENTS

| CN | 101086281 A | 12/2007 |
| CN | 103195830 A | 7/2013 |

(Continued)

*Primary Examiner* — Stacey A Fluhart

(57) ABSTRACT

A clutch pack for a clutch in a drive train of a motor vehicle includes an axis defining an axial direction and a disk, rotatable about the axis, for contacting a counter-disk to transfer a torque. The disk includes a main body with a contact region for absorbing torque from or transferring a torque to the counter-disk, a toothed region for torque-transmitting contact with a disk carrier, and a region of specific elastic softness in the axial direction disposed between the contact region and the toothed region. In an example embodiment, the region of specific elastic softness in the axial direction is a steel sheet spring region.

13 Claims, 2 Drawing Sheets

(56) References Cited

U.S. PATENT DOCUMENTS

| | | | | |
|---|---|---|---|---|
| 2,333,308 | A | * 11/1943 | Goodwin | F16D 13/64 192/107 C |
| 2,380,835 | A | * 7/1945 | Goodwin | F16D 13/64 192/107 C |
| 2,738,864 | A | * 3/1956 | Becker | F16D 25/0638 192/70.14 |
| 5,566,803 | A | * 10/1996 | Lindner | F16D 13/64 192/107 C |
| 5,927,460 | A | 7/1999 | Ament | |
| 2006/0289270 | A1 | 12/2006 | Buer | |
| 2007/0048082 | A1 | 3/2007 | Hoffmann et al. | |

FOREIGN PATENT DOCUMENTS

| | | | |
|---|---|---|---|
| CN | 103221705 A | 7/2013 | |
| CN | 103256317 A | 8/2013 | |
| DE | 879349 C | 6/1953 | |
| DE | 3320977 C1 | 12/1984 | |
| DE | 102005030192 A1 | 2/2006 | |
| DE | 102007024114 A1 | 12/2007 | |
| DE | 102008006155 A1 | 7/2009 | |
| DE | 102015213953 A1 | 1/2017 | |
| DE | 102016014723 A1 | 6/2018 | |
| DE | 102017130284 A1 | 6/2019 | |
| DE | 102018110547 B3 | 7/2019 | |
| DE | 102018103524 A1 | 8/2019 | |
| DE | 102018103981 A1 | 8/2019 | |
| DE | 102018122194 A1 * | 3/2020 | |
| EP | 0647792 A1 | 4/1995 | |
| EP | 3249258 A1 * | 11/2017 | F16F 15/145 |

\* cited by examiner

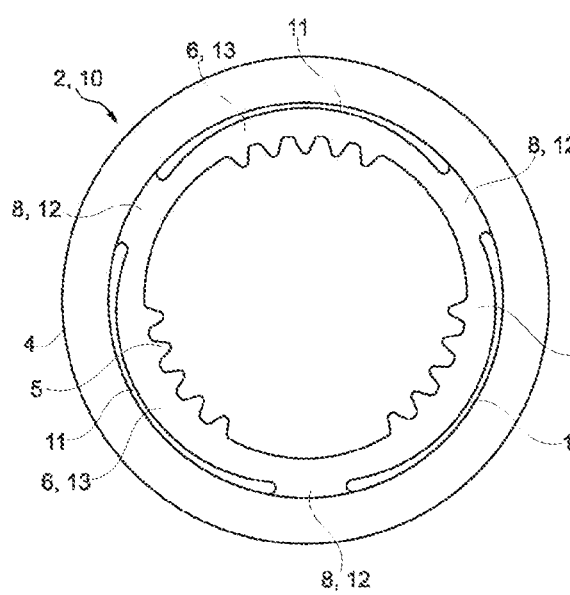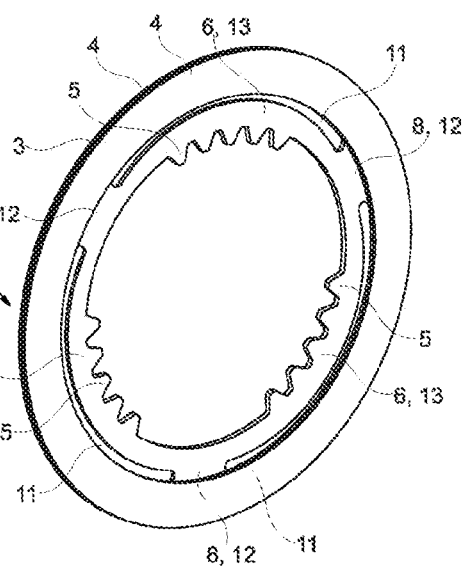

CLUTCH PACK HAVING AXIAL SOFTNESS INTRODUCED IN A SPECIFIC MANNER

CROSS-REFERENCE TO RELATED APPLICATIONS

This application is the United States National Phase of PCT Appln. No. PCT/DE2019/100536 filed Jun. 12, 2019, which claims priority to German Application No. DE102018119002.6 filed Aug. 6, 2018, the entire disclosures of which are incorporated by reference herein.

TECHNICAL FIELD

The present disclosure relates to a clutch pack for a clutch in a drive train of a motor vehicle, wherein disks are provided for contacting counter-disks in order to transfer torque. At least one of the disks has a main body having a contact region for directly or indirectly absorbing torque from or transferring torque to a counter-disk, and a toothed region is provided for being in torque-transmitting contact with a disk carrier. The disclosure further relates to a hybrid module having a dry clutch, for example designed as a K0 clutch, that has a clutch pack according to the disclosure.

BACKGROUND

With multi-disk clutches, in particular in the dry version, when the clutch is closed (torque build-up), frictional forces occur in the multi-disk toothing, which reduce the contact pressure and thus the torque capacity of the clutch. The more disks are used, the greater the effect. In the case of automated clutch systems, friction coefficient fluctuations can lead to undesirable torque jumps, and good controllability is difficult.

Various measures for reducing friction are already known, for example by means of coatings. Furthermore, there are concepts for connecting the disks to one another by means of leaf or corrugated springs, whereby no friction force can arise in the first place. Such a concept is disclosed, for example, in DE 10 2017 130 284 A1, which discloses a clutch in the manner of a multi-plate clutch and a multi-disk clutch, which has outer disks and inner disks which can be brought into torque-transmitting contact to transfer torque from a torque input component to a torque output component by means of an actuating device. At least one leaf spring element is arranged prestressed between two adjacent outer disks in order to space the outer disks from one another, and the leaf spring element is non-rotatably and axially fixedly connected to the respective adjacent outer disk. Furthermore, a drive train for a motor vehicle is also disclosed, having at least one internal combustion engine, a torque input component, a torque output component and a clutch described above. The clutch is arranged between the torque input component and the torque output component. This concept may be associated with high assembly costs, however.

DE 10 2018 103 981 A1 discloses a friction clutch for a drive train of a motor vehicle, having an input part, an output part, at least one spring device and at least one leaf spring. The input part has an outer disk carrier that is rotatable about an axis of rotation by at least one drive motor, and at least one outer disk is attached to the outer disk carrier. The output part has a rotor carrier and an inner disk carrier separated from the rotor carrier, and at least one inner disk is attached to the inner disk carrier. The at least one outer disk and the at least one inner disk can be prestressed by the at least one spring device with a contact pressure for closing the friction clutch. The at least one leaf spring is connected to the inner disk carrier and the rotor carrier in such a way that the at least one leaf spring increases the contact pressure with a reinforcing force when a torque is introduced by the drive motor.

Such friction clutches are used, for example, as K0 clutches in hybrid modules. Such a hybrid module is known for example from DE 10 2018 103 524 A1. This discloses a hybrid module having a rotation axis for a drive train of a motor vehicle with at least the following components: a torque receiving means for receiving a torque from an electric machine; a dry multi-disk clutch having two disk cages, and at least one outer disk in the outer cage and a number of inner disks corresponding to the number of outer disks in the inner cage are suspended so that they can move axially, so that they form a clutch pack. The clutch pack is axially compressible to transmit a torque and the at least one outer disk and the corresponding number of inner disks form a plurality of friction pairings by means of friction surfaces facing one another in pairs. At least one of the counter-disks has a plurality of mechanically offset tooth flanges, and the tooth flanges are offset in such a way that an axial relative movement relative to the friction surface is enabled.

Further prior art is known, for example, from DE 10 2018 110 547 A1. This discloses a friction clutch device with a force transmission device as well as a plate spring, and the force transmission device is set up to transmit a substantially axially aligned compressive force exerted or exertable by the plate spring. The friction clutch device also includes a friction set having a plurality of disks, that, when compressed by means of an axially acting force torque, can be transmitted by friction. A spring device is arranged axially between the friction pack and the force transmission device, with which a spring force can be applied to the friction pack in the axial direction as a function of the axial spring travel of the spring device. The spring device is arranged and set up such that, when loading the spring device with the compressive force, the vectors of the force pair generated by the spring device in the axial direction have substantially the same radial position. This friction clutch device enables a coupled combustion unit to be started by means of a connected electrical machine while modulating the contact pressure acting on the friction pack.

SUMMARY

The present disclosure provides a connection to the disk which, despite friction between the multi-disk toothing and the disk carrier (cage), does not entail any or only very little loss of contact pressure.

The disclosure provides a device with a region of specific elastic softness applied in the axial direction between the contact region and the toothed region.

The region of axial elastic softness makes it possible to prevent possible jamming of the disks in the disk carrier when the clutch is closed and to avoid irregularities in the effective force or torque jumps.

The region may be designed as a steel sheet spring region. The steel sheet spring region is designed in such a way that it has a low rigidity in the axial direction. For this purpose, it may be designed as a thin steel sheet.

In some example embodiments, the steel sheet spring region is an integral/single-material/one-piece component of the main body or is attached, e.g., non-detachably, for example via riveting, to the main body as a separate component. The steel sheet spring region can be provided as an integral part of the main body if the disk is designed as a friction disk, since the main body of the friction disks (due to the friction linings) can be made thinner than a disk designed as a steel disk. In the case of a steel disk, the steel sheet spring region is preferably to be attached to the main body as a separate component.

The main body may have at least one arm extending in the radial direction. The main body may have a plurality of such arms, which may be arranged evenly distributed over the circumference.

In an example embodiment, the steel sheet spring region is designed as a leaf spring or a corrugated spring. This enables standard parts to be used, which can reduce costs.

Furthermore, one embodiment provides that a gap is formed in the radial direction between the contact region and the steel sheet spring region. This may increase or improve the effect of the axially elastic rigidity in the case of the integrally formed disk and steel sheet spring region combination.

In some example embodiments, the toothed region is offset radially inwards or outwards as seen from the contact region. This makes assembly easier and the region of toothing engagement between the toothed region of the disk and the disk carrier is free of other components that could possibly have a negative impact on the toothing engagement during operation.

The toothed region may be formed only in sections over the (inner/outer) circumference. Depending on the type of disk, the toothed region is either limited on the outer circumference, which corresponds to an outer disk, or is formed on the inner circumference, which corresponds to an inner disk.

The toothed region may be formed integrally with the steel sheet spring region. As a result, the toothed region is integrated into the region of axial softness and thus enables the disk to be displaced evenly even if the toothed region gets stuck in the disk carrier.

Furthermore, a steel sheet spring region may extend from one side of an arm in the circumferential direction to the other side of this arm or another arm, e.g., if the steel sheet spring region is designed as a separate component from the main body of the disk. This spring region is used to introduce the elastic softness that acts in the axial direction.

The main body may be designed as a thin steel sheet with low rigidity in the axial direction. In this case, the steel sheet spring region can be designed as an integral part of the main body, as a result of which the assembly effort is reduced.

The hybrid module according to the disclosure can be provided both with an axially parallel electric motor and with a coaxial electric motor.

In other words, the disclosure provides a disk designed in such a way that it allows an axial displacement in the region of the friction surface despite friction-prone/jamming toothing. An example embodiment provides that the axial softness is realized by a corrugated spring. The toothing to the disk carrier is integrated in the corrugated spring. Such an embodiment can be used for both steel and friction disks. The corrugated spring is riveted to the disk. Another exemplary embodiment provides that the axial softness is integrated into the carrier plate or the disk. For this purpose, the toothing is left free and connected to the actual disk via a certain lever arm.

It can therefore also be said that the disclosure relates to a dry multi-disk clutch which is designed as a K0 clutch in a hybrid module for connecting and disconnecting an internal combustion engine to and from the drive train of a motor vehicle. The hybrid module may be a hybrid module with a coaxial electric engine, the rotor of which surrounds the K0 clutch, or a hybrid module with an electric engine parallel to the axis driving a pulley surrounding the K0 clutch. For this purpose, the disks are softly attached in the axial direction. In an example embodiment, the axial softness is realized by a corrugated spring, and the toothing for the disk carrier is integrated into the corrugated spring. In another embodiment, the axial softness is integrated into the carrier sheet or the disks.

Two spring devices, each attached to a disk, may be supported (directly or indirectly) on one another (for the transmission of axial forces).

If the spring devices are attached to the disk as separate components, the spring devices may be supported on one another with the interposition of a rivet.

In some example embodiments, each spring device is provided by a main body component or a component that is separate therefrom.

BRIEF DESCRIPTION OF THE DRAWINGS

The disclosure is explained in more detail below with the aid of figures in which different embodiments are shown. It can be seen that:

FIG. 3 shows a front view of the disk in a second exemplary embodiment; and

FIG. 4 shows the disk from FIG. 3 in a perspective view.

DETAILED DESCRIPTION

The figures are only schematic in nature and serve only for understanding the disclosure. The same elements are provided with the same reference symbols.

Features of the individual exemplary embodiments can also be implemented in other exemplary embodiments. So, they are thus interchangeable with one another.

Figure 1:
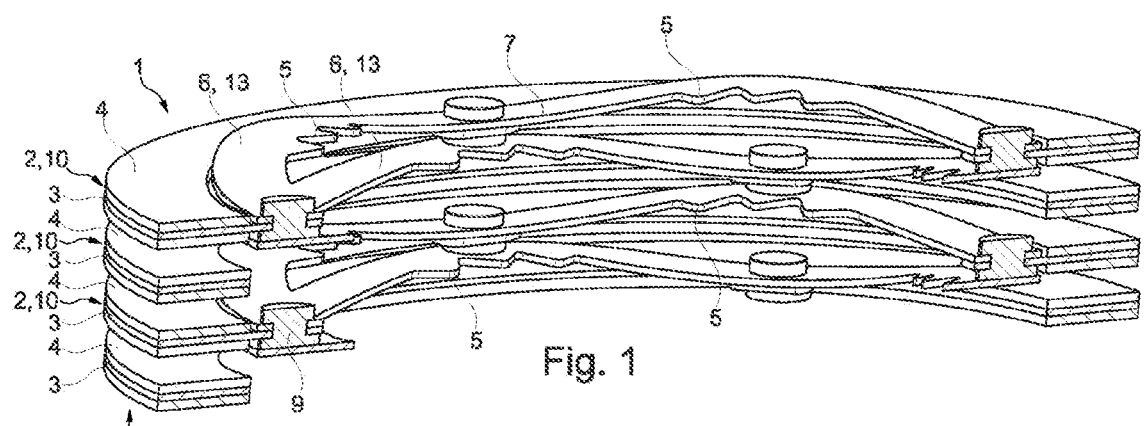
FIG. 1 shows a longitudinal sectional view of a clutch pack according to the invention in a first embodiment.

FIG. 1 shows a longitudinal sectional view of a clutch pack 1 according to the disclosure. The clutch pack 1 includes four disks 2, each of which has a main body 3, which is made of steel, for example. Furthermore, the main body 3 has a contact region 4 which, in the assembled state of a clutch, comes into contact with counter-disks (not shown) in order to transmit a torque by frictional engagement.

Radially on the inside of the disks 2 is a toothed region 5, via which the disks 2 can be connected to a disk carrier (not shown) in a torque-transmitting manner. Between the contact region 4 and the toothed region 5, there is a region 6 which introduces an elastic softness in the axial direction. This means that the region 6 has only a low level of rigidity in the axial direction.

In the first exemplary embodiment shown here, the toothed region 5 and the region 6 are formed integrally/in one piece/in one material and separately from the disk 2. More precisely, in the example shown, the toothed region 5 and the region 6 are designed as a corrugated spring 7.

Figure 2:
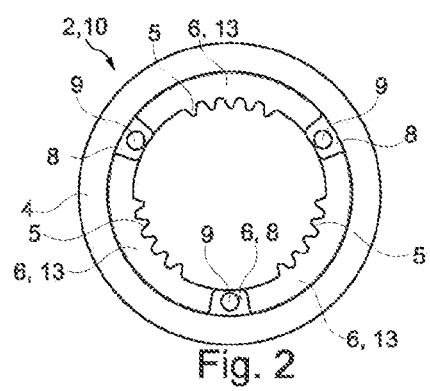
FIG. 2 shows a front view of a disk having a toothed region in the first embodiment.

In FIG. 2, it can be clearly seen that the main body 3 has arms 8 extending radially inward, on which the corrugated spring 7 is connected to the disk 2 by means of a rivet 9. Here, the arms 8 are arranged evenly distributed over the circumference. This ensures that the entire corrugated spring 7 is subjected to uniform loading.

Referring back to FIG. 1, it can be clearly seen that corrugated springs 7 adjacent to one another are arranged in such a way that they are each supported in the region of the rivet 9 of the adjacent corrugated spring 7 with a region which is arranged between two rivets 9 or between two arms 8. This means that the rivets 9 or the arms 8 of two adjacent disks 2 are offset from one another in such a way that the rivets 9 or arms 8 of one disk 2 are at half the angle that is located between two rivets 9 or arms 8 of the adjacent disk 2.

The embodiment of the disks 2 shown in FIG. 1 represents inner disks 10. Alternatively, the concept is also conceivable for outer disks, in which the toothed region 5 (and the region 6) are, however, located radially outside the contact region 4 of the disk. In addition, the disks 2 shown in FIG. 1 are designed as friction disks. However, it is also conceivable that the concept is used for steel disks.

FIGS. 3 and 4 show a second exemplary embodiment with the disk 2 designed as an inner disk 10. In the embodiment shown here, the main body 3 of the disk 2 is formed integrally/in one piece/in one material with the region of targeted axial softness 6 and the toothed region 5. In this exemplary embodiment, too, the region 6 is connected to the main body 3 via arms 8, wherein here the main body 3, the arms 8 and the region 6 are, however, formed integrally, i.e., in one piece/from one material. A gap 11 is cut out between the contact region 4 and the region 6 (with the toothed region 5), whereby the region 6 is spaced apart from the contact region 4 when viewed in the radial direction and the arm 8 serves as a kind of lever arm that enables the region 6 (and the toothed region 5) to elastically deform under load due to their low rigidity in the axial direction without the main body 3, in particular the contact region 4, (elastically) deforming. The arms 8 in this embodiment are similar to webs due to the gap 11 formed between two mutually adjacent arms 8 and between the contact region 4 and the region 6, which is why the arms 8 can also be referred to as webs 11.

For the second exemplary embodiment, the region 6 which has the axial softness can also be referred to as a steel sheet spring region 13. However, the corrugated spring 7 used in the first exemplary embodiment also represents a steel sheet spring region, which is why the region 6 can generally be described as a steel sheet spring region 13.

REFERENCE NUMERALS

1 Clutch pack
2 Disk
3 Main body
4 Contact region
5 Toothed region
6 Region of axial softness
7 Corrugated spring
8 Arm
9 Rivet
10 Inner disk
11 Gap
12 Web
13 Steel sheet spring region

The invention claimed is:

1. A clutch pack for a clutch in a drive train of a motor vehicle, comprising:
 an axis defining an axial direction;
 a disk, rotatable about the axis, for contacting a counter-disk to transfer a torque, the disk comprising:
  a main body comprising a contact region for absorbing torque from or transferring a torque to the counter-disk;
  a toothed region comprising:
   a plurality of circumferentially arranged sections, each comprising a plurality of individual teeth, evenly distributed over a circumference, and
   a plurality of arcuately shaped portions, devoid of teeth, arranged between respective pairs of the plurality of circumferentially arranged sections; and
  an axially flexible region disposed between the contact region and the toothed region.

2. The clutch pack of claim 1, wherein the axially flexible region is a steel sheet spring region.

3. The clutch pack of claim 2, wherein the steel sheet spring region:
 is an integral part of the main body; or
 is attached to the main body as a separate component.

4. The clutch pack of claim 2, wherein the steel sheet spring region is a leaf spring or corrugated spring.

5. The clutch pack of claim 2, further comprising a radial gap formed between the contact region and the steel sheet spring region.

6. The clutch pack of claim 2, wherein the toothed region is formed integrally with the steel sheet spring region.

7. The clutch pack of claim 2, wherein:
 the toothed region is formed integrally with the steel sheet spring region and separately from the main body;
 the main body comprises a plurality of radially extending arms;
 the steel sheet spring region comprises a plurality of mounting regions, each arranged radially outside of a one of the plurality of arcuately shaped portions; and
 the radially extending arms are fixed to respective ones of the plurality of mounting regions.

8. The clutch pack of claim 7 wherein a quantity of mounting regions in the plurality of mounting regions is equal to a quantity of circumferentially arranged sections in the plurality of circumferentially arranged sections.

9. The clutch pack of claim 8 further comprising a plurality of disks stacked together and arranged such that the rivets on each disk in the plurality of disks are circumferentially aligned with the plurality of circumferentially arranged sections on an axially adjacent disk in the plurality of disks.

10. The clutch pack of claim 7 wherein the radially extending arms are fixed to respective ones of the plurality of mounting regions by rivets.

11. The clutch pack of claim 1, wherein the main body comprises a radially extending arm.

12. The clutch pack of claim 1, wherein the toothed region is radially inside of the contact region.

13. A hybrid module comprising a clutch, wherein the clutch comprises the clutch pack of claim 1.

* * * * *